(12) United States Patent
Moineau et al.

(10) Patent No.: US 9,243,091 B2
(45) Date of Patent: Jan. 26, 2016

(54) CHROMIUM CATALYSED ETHYLENE COPOLYMER POWDER

(75) Inventors: Christophe Moineau, Nivelles (BE); Stephan Detournay, Belgium (BE); Pierre Mangin, Istres (FR); Julie Bigeault, Marseille (FR)

(73) Assignee: INEOS SALES (UK) LIMITED, Lyndhurst, Hampshire (GB)

( * ) Notice: Subject to any disclaimer, the term of this patent is extended or adjusted under 35 U.S.C. 154(b) by 157 days.

(21) Appl. No.: 13/879,725

(22) PCT Filed: Oct. 5, 2011

(86) PCT No.: PCT/EP2011/067368
§ 371 (c)(1),
(2), (4) Date: Apr. 16, 2013

(87) PCT Pub. No.: WO2012/059290
PCT Pub. Date: May 10, 2012

(65) Prior Publication Data
US 2013/0216835 A1  Aug. 22, 2013

(30) Foreign Application Priority Data
Nov. 1, 2010 (EP) .................... 10189545

(51) Int. Cl.
*C08F 4/24* (2006.01)
*C08F 210/16* (2006.01)
*C08F 10/02* (2006.01)
*C08F 210/02* (2006.01)
*C08F 110/02* (2006.01)

(52) U.S. Cl.
CPC ............... *C08F 210/16* (2013.01); *C08F 10/02* (2013.01); *C08F 210/02* (2013.01); *C08F 110/02* (2013.01); *Y10T 428/2982* (2015.01)

(58) Field of Classification Search
None
See application file for complete search history.

(56) References Cited

U.S. PATENT DOCUMENTS

| 4,981,826 A | 1/1991 | Speca |
| 6,989,344 B2 | 1/2006 | Cann |
| 7,915,357 B2 | 3/2011 | Cann |

FOREIGN PATENT DOCUMENTS

| EP | 2 172 490 A1 | 4/2010 |
| WO | WO 03/033550 A1 | 4/2003 |
| WO | WO 2009/097379 A1 | 8/2009 |
| WO | WO 2010/037650 A1 | 4/2010 |

OTHER PUBLICATIONS

Specification of co-pending National Phase U.S. Appl. No. 13/879,681, filed Apr. 16, 2013, (PCT Int'l Application No. PCT/EP2011/067363, WO 2012/059289 A1, filed Oct. 5, 2011); 21 pgs.

*Primary Examiner* — Ling Choi
*Assistant Examiner* — Catherine S Branch
(74) *Attorney, Agent, or Firm* — Nixon & Vanderhye P.C.

(57) ABSTRACT

The present invention relates to a chromium catalyzed ethylene copolymer powder exhibiting a superior fragmentation coefficient.

23 Claims, No Drawings

CHROMIUM CATALYSED ETHYLENE COPOLYMER POWDER

This application is the U.S. national phase of International Application No. PCT/EP2011/067368 filed 5 Oct. 2011 which designated the U.S. and claims priority to European Patent Application No. 10189545.6 filed 1 Nov. 2010, the entire contents of each of which are hereby incorporated by reference.

The present invention relates to a chromium catalysed ethylene copolymer powder.

In particular, the present invention relates to a chromium catalysed ethylene copolymer powder exhibiting a superior fragmentation coefficient.

More particularly, the present invention relates to a chromium catalysed ethylene copolymer powder which is obtainable by a process for the co-polymerisation of ethylene with an alpha-olefin, in particular the gas phase polymerisation of ethylene with an alpha-olefin, with the aid of a supported chromium oxide based catalyst.

Whilst, it is common general knowledge to produce polymers in gas phase in the presence of supported chromium oxide based catalyst, the man skilled in the art is still trying to obtain polymers with the right combination of product properties, particularly properties appropriate for pipe purposes, while still having a high productivity and avoiding production problems, e.g. fines and/or temperature upsets. Therefore, it would be desirable to obtain a resin product with desirable properties, e.g., sufficiently high Environmental Stress Crack Resistance (ESCR), high Creep behaviour and high resistance against rapid crack propagation with the right melt index (MI), while also achieving high catalyst activity, in particular using a gas phase process, more particularly a fluidized bed gas phase process.

In the course of their continuous developments to provide such a process for preparing ethylene (co-) polymers, preferably in gas phase, having high Environmental Stress Crack Resistance (ESCR) and high Creep behaviour in the presence of a supported chromium oxide based catalyst, the Applicants have unexpectedly found a new polymer powder exhibiting superior morphological properties as claimed and exemplified hereafter.

The subject of the present invention is therefore a chromium catalysed ethylene copolymer powder characterised by a particle fragmentation coefficient ("m") equal or superior to 0.29, preferably 0.30, more preferably 0.31.

For the purpose of the present invention and appended claims, the particle fragmentation coefficient ("m") of the copolymer powder is defined as follows $$m = \mathrm{Ln}(\text{APS particle}/\text{APS catalyst})/\mathrm{Ln}(\text{Productivity})$$

wherein
"Ln" is the "natural logarithm",
"APS particle" is the median particle size (D50) of the polymer powder,
"APS catalyst" is the median particle size (D50) of the chromium catalyst, and
"Productivity" is the number of grams of polymer per gram of catalyst.

Any conventional means for example a Malvern or a mesh sieving technique can be used to measure the median particle size of the polymer powder and of the catalyst. For the purposes of the present invention and appended claims, the measurement of the median particle size (D50) was made according to the International Standard ISO 13320:2009 ("Particle size analysis—Laser diffraction methods"). For example, Malvern Instruments' laser diffraction systems can advantageously be used, e.g. a Malvern Mastersizer S or a Malvern Mastersizer 2000; such instrument together with its operating manual meets or even exceeds the requirements set-out within the ISO 13320 Standard.

Preferably, the D50 of the polymer powder according to the present invention is lower than 2000, preferably comprised between 200 and 1800, more preferably comprised between 500 and 900 microns. When a Malvern Mastersizer S is used for measuring the powder D50, the Malvern spray procedure is preferably selected.

Preferably, the D50 of the chromium catalyst used in the present invention is lower than 150, preferably comprised between 40 and 140, more preferably comprised between 45 and 110 microns. When a Malvern Mastersizer S is used for measuring the chromium catalyst D50, the Malvern wet dispersion procedure (Qspec Large volume sample dispersion unit) is preferably selected. For the purpose of the present invention and appended claims, the D50 measurement is performed on the catalyst before its introduction into the polymerisation reactor; thus, for the avoidance of doubt, if the catalyst is subjected to a treatment that may substantially affect its morphology before introduction into the reactor, the D50 measurement must be performed on said treated catalyst. For example, if the chromium catalyst is subjected to an activation procedure before its introduction into the reactor, the D50 measurement will be performed on the activated catalyst.

The ethylene copolymer powder according to the present invention preferably exhibits a spherical and/or spheroidal morphology.

For the purpose of the present invention and appended claims, spheroidal morphology means shaped like a sphere but not perfectly round, especially an ellipsoid shape that is generated by revolving one or more ellipse around one of its axes.

Thus, for the purpose of the present invention and appended claims, by "spherical and/or spheroidal morphology", it is meant that the copolymer powder exhibits spherical and/or spheroidal shape morphology. Such spherical and/or spheroidal morphology of said copolymer powder (or particles) is usually identified by taking microscopy pictures of said particles; this is currently how the man skilled in the art can identify the presence of a spherical and/or spheroidal particles.

Whilst not wishing to be bound by this theory, the Applicants believe that the improved morphology of the polymer powder according to the present invention has been obtained thanks to the use of an improved activated supported chromium oxide based catalyst; in particular, the Applicants believe according to a preferred embodiment of the present invention that the improved morphology of the polymer powder has been obtained thanks to the use of an improved activated supported chromium oxide based catalyst in a fluidised bed gas phase polymerisation of the corresponding monomer (s).

Thus, the present invention also relates to a chromium catalysed ethylene copolymer powder having a particle fragmentation coefficient ("m") equal or superior to 0.29, such ethylene copolymer having been obtained by the polymerisation of the corresponding monomers in the presence of an activated supported chromium oxide based catalyst; according to a preferred embodiment of the present invention, the process for the activation of said supported chromium oxide based catalyst is performed in a fluidised bed activation reactor which comprises a catalyst bed being fluidised by a fluidisation gas, said activation including treatment at temperatures above 500° C., characterised in that the fluidisation velocity (Vf1) of the fluidisation gas is initially maintained below 6.5 centimeters per second (cm/sec), preferably below 6 cm/sec, more preferably below 5.5 cm/sec, even more preferably below 5 cm/sec until the temperature inside the activation reactor reaches at least 200° C., and said fluidisation gas is then brought to a value (Vf2) which is at least 1 cm/sec higher than Vf1.

Thus, the present invention additionally relates to a chromium catalysed ethylene copolymer powder having a particle fragmentation coefficient ("m") equal or superior to 0.29, such ethylene copolymer having been obtained by the gas phase polymerisation of ethylene together with at least one other alpha olefin containing from 3 to 12 carbon atoms in the presence of a supported chromium oxide based catalyst which has been subjected to an activation treatment in a fluidised bed activation reactor which comprises a catalyst bed being fluidised by a fluidisation gas, said activation including treatment at temperatures above 500° C., characterised in that the fluidisation velocity (Vf1) of the fluidisation gas is initially maintained below 6.5 centimeters per second (cm/sec), preferably below 6 cm/sec, more preferably below 5.5 cm/sec, even more preferably below 5 cm/sec until the temperature inside the activation reactor reaches at least 200° C., and said fluidisation gas is then brought to a value (Vf2) which is at least 1 cm/sec higher than Vf1.

The Applicants have unexpectedly discovered that the fragmentation problems encountered with the prior art methods could be overcome by actively controlling the fluidisation gas velocity during the initial thermal treatment of the supported chromium oxide based catalyst. Indeed, keeping the fluidisation gas velocity at low levels for a certain period of time during the initial thermal treatment step of the raw supported chromium oxide based catalyst before increasing said velocity to a higher value has proven to be critical for obtaining the final polymer exhibiting the desired product properties whilst overcoming the prior art catalyst fragmentation problems.

According to a preferred embodiment of the present invention, the above control of fluidisation velocity during the initial stage of the activation process is maintained until the temperature inside the activation reactor reaches 250° C., preferably 300° C.; it can also advantageously be maintained correspondingly until 400° C. or 500° C. or even 600° C.

According to a preferred embodiment of the present invention, the fluidisation velocity during the initial stage of the activation process is maintained above 1.5 cm/s, preferably above 2 cm/s.

The fluidisation gas used during the initial stage of the activation process can advantageously be chosen amongst inert gases, e.g. nitrogen, and/or oxidising gases, e.g. air, or sequentially an inert gas followed by an oxidising gas; an inert gas is preferably used as fluidisation gas during this initial activation stage.

According to an embodiment of the present invention, the catalyst bed activated according to the present invention has a height at rest of at least 0.5 meter, preferably at least 1 meter, more preferably at least 1.5 meter. Indeed, the Applicants have found in the course of their developments that the control of the fluidisation velocity of the fluidisation gas during the initial stage of the activation inside their commercial fluidised bed activation reactor was critical. This finding was unexpected because the same problem/solution is not applicable to small scale activators e.g. laboratory scale activators wherein a very broad ranges of fluidisation gas velocities can be used during the catalyst activation without exhibiting any significant differences in the final properties of the activated catalyst. This is why the man skilled in the art concentrated his studies over the past decades on the temperature, the temperature ramps, the temperature holding times and the nature of the fluidisation gas. For commercial scale activators, the man skilled in the art usually recommended to use fluidisation gas velocities much beyond 6 cm/s, preferably at least 9 cm/sec in order to guarantee an appropriate fluidisation of the bed.

The initial fluidisation stage of the activation process according to the present invention is then followed by at least another fluidisation stage which is performed on the same catalyst bed in the same activation reactor with a fluidisation gas wherein said fluidisation gas is brought to a value (Vf2) which is at least 1 cm/sec higher than Vf1. Said fluidisation velocity Vf2 is preferably at least 1.5 cm/sec higher than Vf1, more preferably at least 2 cm/sec higher than Vf1.

The fluidisation gas used during this consecutive stage of the activation process can advantageously be chosen amongst inert gases, e.g. nitrogen, and/or oxidising gases, e.g. air, or sequentially (and preferably) an inert gas followed by an oxidising gas.

Said consecutive fluidisation stage preferably includes thermal treatments with holding temperatures higher than 500° C., preferably higher than 600° C.

Said consecutive fluidisation stage thus preferably comprises the use of a fluidisation velocity Vf2 which is at least 1 cm/sec higher than Vf1. Said fluidisation velocity Vf2 is preferably at least 1.5 cm/sec higher than Vf1, more preferably at least 2 cm/sec higher than Vf1. Vf2 is preferably of at least 6 cm/s, preferably at least 7 cm/s, for example at least 8 cm/s. In order to avoid entrainments or excessive turbulences inside the activation reactor, said fluidisation gas velocity is usually maintained below 12 cm/s, preferably below 11 cm/s, for example below 10 cm/s.

The duration of the initial fluidisation stage according to the present invention is not critical but preferably lasts at least 10 minutes, preferably at least 1 hour, more preferably at least 3 hours, for example at least 8 hours.

The duration of the consecutive fluidisation stage according to the present invention is not critical but preferably lasts at least 10 minutes, preferably at least 1 hour, more preferably at least 3 hours, for example at least 8 hours.

According to a preferred embodiment of the present invention, the consecutive fluidisation stage (i.e. the fluidisation stage performed at a higher fluidisation velocity) comprises at least two separate thermal treatment steps wherein the first step consists in bringing the catalyst from the initial stage under an inert atmosphere to a temperature comprised between 600 and 900° C. and then keeping the catalyst during a holding time of less than or equal to 8 hours under an inert atmosphere at a temperature comprised between 600 and 900° C., and the second step consists in the treatment of the catalyst coming from step 1 under an oxidizing atmosphere, preferably air, at a temperature comprised between 400 and 700° C. during a holding time comprised between 2 and 10 hours, and wherein the maximum temperature of step 2 is always lower than the maximum temperature of step 1 and wherein the difference between the maximum temperature of step 1 and the maximum temperature of step 2 is comprised between 50 and 250° C.

The present invention has proven to be particularly useful when the supported chromium oxide based catalyst is a titanium modified supported chromium oxide based catalyst.

According to a preferred embodiment of the present invention, the raw catalyst or the activated catalyst itself is not contacted with an alkylboron compound before or during (co-) polymerization. Thus, preferably, the present invention does not contemplate the activation of our catalyst by a cocatalyst such as with an alkylboron.

The refractory oxide support for the chromium oxide based catalyst used in the process of the present invention is preferably a spherical and/or spheroidal refractory oxide. It can preferably be silica, alumina, aluminophosphate, metal oxides such as oxides of titanium, zirconium, boron, zinc, magnesium, and the like, or combinations thereof; more preferably, it essentially consists of silica or more preferably silica doped with titanium, aluminium or boron.

The spherical and/or spheroidal refractory oxide support may suitably be prepared by spray drying of washed and aged hydrogel particles or spray setting of a hydrosol. Such processes are well known in the art and typically result in spherical and/or spheroidal particles. The particle size may be adjusted by selection of conditions. In this invention the median (volume) particle diameter of the spherical and/or spheroidal particles measured after drying is from 10 to 250 μm, preferably from 20 to 200 μm and most preferably from 20 to 150 μm. The International Standard ISO 13320:2009 ("Particle size analysis—Laser diffraction methods") can be used for measuring said median particle size characteristic. Particle diameters are indeed typically measured using light scattering techniques. For example, Malvern Instruments' laser diffraction systems can advantageously be used, e.g. a Malvern Mastersizer S or a Malvern Mastersizer 2000; such instrument together with its operating manual meets or even exceeds the requirements set-out within the ISO 13320 Standard; the Malvern wet dispersion procedure (Qspec Large volume sample dispersion unit) is preferably selected. The resulting spherical and/or spheroidal particles may be further classified e.g. by sieving to tailor the median particle diameter and reduce the amounts of fine and/or coarse particles.

Although handling of the particles may lead to some degree of breakage, particles are preferably not subjected to any deliberate comminution processes.

Preferably, the spherical and/or spheroidal particles are prepared by spray setting of a hydrosol, preferably a silica hydrogel. The resulting spherical and or spheroidal hydrogel particles are suitably subjected to washing and aging processes prior to water removal to generate suitable surface area and pore volume.

In general, the support has a specific surface area ranging from 100 to 800 m2/g, measured according to the BET volumetric method in British Standard BS 4359/1 (1984). Preferably, the specific surface area is more than or equal to 250 m2/g or even more than or equal to 400 m2/g. The specific surface area is preferably less than or equal to 600 m2/g.

Moreover, the support generally has a pore volume higher than 1 mL/g. It may also be higher than 2 mL/g and even higher than 2.5 mL/g. The term "pore volume" should be understood to mean the pore volume measured according to the nitrogen penetration method (BET) with reference to British Standard BS 4359/1 (1984).

The chromium oxide based catalyst deposited on a support used in the process according to the invention usually contains approximately 0.3 to 2% by weight, particularly 0.3 to 1.3% by weight of chromium and even more particularly 0.3 to 1% by weight of chromium, more preferably between 0.3 and 0.7% by weight of chromium, most preferably between 0.4 and 0.6% by weight of chromium (these weights being expressed with respect to the weight of final supported catalyst).

Of course, it is possible to use the catalyst as a blend of 2 different or more different catalysts, at least one on them being defined as hereinabove. It is also possible to use the catalyst as a blend of 2 different or more different catalysts, this blend preferably containing a chromium loading in average defined as hereinabove.

Any known chromium containing compounds capable of reacting with the surface hydroxyl groups of the refractory oxide can be used in the process of preparation of the catalyst. Non-limiting examples of such compounds include chromium nitrate, chromium trioxide, chromate esters such as chromium acetate, chromium acetylacetonate and t-butyl chromate, silyl chromate esters and phosphorous-containing esters, chromium chloride, chromium sulphate and ammonium chromate.

The introduction mode of this chromium compound can be a dry mixing in or outside the activator or by aqueous or non-aqueous impregnation of the support.

Any known titanium containing compound capable of reacting with the surface hydroxyl groups of the refractory oxide can be used in the process of preparation of the preferred catalyst according to the present invention. These compounds include those having the structures (R)mTi(OR')n and (RO)mTi(OR')n where m is 1, 2, 3 or 4; n is 0, 1, 2 or 3 and m+n=4, and where R and R' are a C1 to C12 alkyl, aryl, cycloalkyl group, cyclopentadienyl, C2 to C12 alkenyl groups and combination thereof. These compounds also include those having the structures TiX4 wherein X is chlorine, bromine, fluorine or iodine. The titanium compound can be solid, liquid or in solution in an hydrocarbon solvent.

The introduction mode of the titanium compound can be a dry mixing in or outside the activator or an impregnation of the support with a hydrocarbon solution of the titanium compound. The catalyst used in the process according to the invention preferably contains between 0.5 and 5% by weight of titanium, most preferably between 1.5 and 4%, most preferably between 2 and 4%, most preferably between 2 and 3% (these weights being expressed with respect to the weight of final supported catalyst).

The preferred method of preparation of the catalyst used in the present invention is not important as long as it has the chromium content, the titanium content and the spherical and/or spheroidal morphology as defined hereinabove. According to the present invention the preparation of the catalyst is preferably not carried out by the cogel method. Although the support may contain small amounts of titanium, for instance as an impurity, the method of the invention involves the introduction of a titanium compound on to a support by addition and/or impregnation as defined herein in addition to any titanium contained within the support skeleton.

For the purpose of the present invention and appended claims, spheroidal shape means shaped like a sphere but not perfectly round, especially an ellipsoid shape that is generated by revolving one or more ellipse around one of its axes.

Thus, for the purpose of the present invention and appended claims, by "spherical and/or spheroidal refractory oxide", it is meant that the refractory oxide particles used for the preparation of the catalyst used in the present invention exhibit a spherical or spheroidal shape morphology. Such spherical or spheroidal morphology of said particles is usually identified by taking microscopy pictures of said particles; this is currently how the man skilled in the art can identify the presence of a spherical or spheroidal refractory oxide.

As indicated above, the initial stage of the activation process according to the present invention is preferably performed under an inert atmosphere, preferably under nitrogen, more preferably under dry nitrogen. It is essential according to the present invention that the fluidisation gas velocity is controlled as indicated hereabove during the thermal treatment step(s). Any additional thermal treatment steps could also be performed before our initial stage and/or consecutive stage(s) as defined hereinabove. However, it is preferred according to the present invention that the supported chromium oxide based catalyst is not subjected to any other fluidisation gas treatment before our initial stage and/or consecutive stage(s) as defined hereinabove.

It is also preferred according to the present invention that the step 2 of the preferred embodiment defined hereinabove is performed directly after step 1 without any additional intermediate thermal treatment step.

After our claimed consecutive fluidization stage and/or our claimed step 2 treatment, the activated catalyst is then preferably cooled with the same atmosphere from step 2 or from the consecutive stage, preferably air, to a temperature between 400° C. and 300° C. and further cooled from this temperature to room temperature with inert atmosphere, preferably nitrogen, more preferably dry nitrogen.

Also, according to the present invention, it is preferred that the total duration of any thermal treatment (non oxidising and oxidising steps) above 300° C. of our supported chromium oxide based catalyst is always less than 24 hours, preferably less than 22 hours, more preferably less 20 hours and even more preferably less than 18 hours.

It is obvious for the man skilled in the art that the thermal treatments according to the present invention can be performed continuously or in batch in any appropriate reactor. For continuous mode operations, a configuration with at least two reactors in series is preferred, one reactor operating under an inert atmosphere and one reactor operating under an oxidising atmosphere; in this preferred configuration, our stage 1 is preferably performed in the first reactor and our consecutive stage is preferably performed partly in the first reactor and partly in the second reactor.

According to an embodiment of the present invention, the thermal treatment steps are performed in batch mode in the same fluidized bed reactor.

According to another embodiment of the present invention, the step of bringing the catalyst under an inert atmosphere to a temperature comprised between 600 and 900° C. is performed by introducing the said catalyst into a reactor and gradually increasing the temperature of the reactor with a thermal speed rate comprised between 1 and 2.5° C./min until the desired temperature is reached.

According to the invention, the supported chromium catalysts having undergone the successive heat treatments in nitrogen and in air, under suitable conditions of temperature and duration, are used for the copolymerization of ethylene with at least one C3 to C12 alpha-olefins. By way of examples of olefins that can be used as comonomers, mention may be made of propylene, 1-butene, 4-methyl-1-pentene, 1-hexene, 1-octene, 1-decene, 1-dodecene, styrene, and derivatives thereof. Of course, several olefins may be used simultaneously, particularly 1-butene and/or 1-hexene and/or 1-octene. The process according to the invention applies particularly well to the manufacture of ethylene (co-) polymers but more particularly ethylene (co-) polymers having, after compounding:
 a density between 936 and 941 Kg/m3 and a MI5 between 0.5 and 1.2 dg/min and the pipes produced with this polymer meet the requirements of ISO 4427 and ISO 4437 in hydrostatic pressure testing at 20° C. and 9.0 MPa with a ductile failure at more than 100 hours, or
 a density between 942 and 946 Kg/m3 and a MI5 between 0.4 and 0.6 dg/min and the pipes produced with this polymer meet the requirements of ISO 4427 and ISO 4437 in hydrostatic pressure testing at 20° C. and 9.0 MPa with a ductile failure at more than 100 hours, or
 a density between 943 and 947 Kg/m3 and a MI5 between 0.1 and 0.4 dg/min and the pipes made from this polymer and tested in hydrostatic pressure test at 20° C. under 12.0 MPa will have a time to failure at more than 100 h, the above hydrostatic pressure testing being made following ISO1167-1 and 2.

The process according to the invention applies also particularly well to the manufacture of ethylene (co-) polymers but more particularly ethylene (co-) polymers having, after compounding:
 a density between 952 and 954 Kg/m3 and a HLMI between 4 and 11 dg/min and suitable for film application and HMw blow moulding, or
 a density between 945 and 947 Kg/m3 and a HLMI between 4 and 11 dg/min and suitable for HMw blow moulding, or
 a density between 953 and 960 Kg/m3 and a MI2 between 0.2 and 0.7 dg/min and suitable for general purpose blow moulding.

The (co)polymerization is carried out, in a known manner, by bringing ethylene and other olefins into contact with the catalyst under polymerizing conditions known per se. According to the present invention, the (co)polymerization of the ethylene is preferably carried out in the gas phase. Indeed, the Applicants have unexpectedly found that it was possible to obtain the copolymer powder of the present invention and also after extrusion the corresponding resin product with desirable properties, e.g., sufficiently high Environmental Stress Crack Resistance (ESCR) and high Creep behaviour, with the right melt index (MI), while also achieving high catalyst activity, by using a gas phase process, in particular a fluidized bed gas phase process. Indeed, the ethylene copolymers produced according to the process of the present invention exhibit an excellent compromise between processability, Environmental Stress Crack Resistance (ESCR) and creep behaviour. They may be used in any conventional process for converting thermoplastics, such as, for example, pipe extrusion, blow moulding and blown film. They are very suitable for pipe extrusion.

The present invention also provides ethylene copolymers having, after compounding:
 a density between 936 and 941 Kg/m3 and a MI5 between 0.5 and 1.2 dg/min and the pipes produced with this polymer meet the requirements of ISO 4427 and ISO 4437 in hydrostatic pressure testing at 20° C. and 9.0 MPa with a ductile failure at more than 100 hours, or
 a density between 942 and 946 Kg/m3 and a MI5 between 0.4 and 0.6 dg/min and the pipes produced with this polymer meet the requirements of ISO 4427 and ISO 4437 in hydrostatic pressure testing at 20° C. and 9.0 MPa with a ductile failure at more than 100 hours, or
 a density between 943 and 947 Kg/m3 and a MI5 between 0.1 and 0.4 dg/min and the pipes made from this polymer and tested in hydrostatic pressure test at 20° C. under 12.0 MPa will have a time to failure at more than 100 h, or
 a density between 952 and 954 Kg/m3 and a HLMI between 4 and 11 dg/min and suitable for film application and HMw blow moulding, or
 a density between 945 and 947 Kg/m3 and a HLMI between 4 and 11 dg/min and suitable for HMw blow moulding, or
 a density between 953 and 960 Kg/m3 and a MI2 between 0.2 and 0.7 dg/min and suitable for general purpose blow moulding, the above hydrostatic pressure testing being made following ISO1167-1 and 2,
characterised in that the copolymer is obtainable by a polymerisation process, preferably a gas phase polymerisation process, of ethylene with at least one alpha olefin containing from 3 to 12 carbon atoms in the presence of a supported chromium oxide based catalyst wherein the supported chromium oxide based catalyst is preferably a titanium modified supported chromium oxide based catalyst;

the supported chromium oxide based catalyst has preferably a chromium content comprised between 0.3 and 2 wt %; and the titanium modified supported chromium oxide based catalyst has been subjected to a thermal treatment as disclosed hereinabove.

EXAMPLE 1

A catalyst PQC35105 which is a silica supported catalyst exhibiting a spheroidal shape has been subjected to the activation procedure indicated in the table 1 below in a fluidized bed reactor. Said PQC35105 catalyst is prepared by impregnating a PQ commercial silica support, MS-3050, with chromium and titanium species using non aqueous solvent. Removal of solvent by evaporation results in a catalyst composition containing 0.5% w/w chromium and 2.5% w/w titanium on a calcined (1000 C) weight basis.

The preparation and characteristics of the microspherical support MS-3050 are detailed within "Current Achievements on Heterogeneous Olefin Polymerization Catalysts", Sankeisha Co., Ltd, Nagoya, M. Terano, Ed., p. 57-58 (2004). The first stage is the production of spherical hydrogel particles by spray setting. These hydrogel particles are aged, washed and then subjected to solvent exchange with organic solvent and evaporation to generate spherical particles having a median particle diameter of about 90 μm measured by Malvern, surface area of about 500 m$^2$/g and pore volume of about 3.0 ml/g. Both surface area and pore volume are determined by nitrogen porosimetry. The SEM image in FIG. 2a within this publication illustrates the microspherical morphology. Said PQC35105 catalyst has, before activation, a surface area of about 470 m$^2$/g, a pore volume of about 2.70 ml/g and a median particle diameter of about 90 μm.

TABLE 1

| Step | Fluidsation gas | Fluidization rate cm/s | Bed temperature (° C.) | Duration (h) | Cumulated time (h) |
|---|---|---|---|---|---|
| Start | N2 | 5 | 25 | 0.0 | 0.0 |
| Heat up | N2 | 5 | 150 | 1.4 | 1.4 |
| Hold | N2 | 5 | 150 | 1.0 | 2.4 |
| Heat up | N2 | 5 | 500 | 3.9 | 6.3 |
| Vf Change | N2 | 9 | 500 | 0.0 | 6.3 |
| Heat up | N2 | 9 | 800 | 3.3 | 9.6 |
| Hold | N2 | 9 | 800 | 1.0 | 10.6 |
| Cool down | N2 | 9 | 650 | 1.7 | 12.3 |
| Gas change | Air | 9 | 650 | 0.0 | 12.3 |
| Hold | Air | 9 | 650 | 6.0 | 18.3 |
| Cool down | Air | 9 | 350 | 3.3 | 21.6 |
| Gas change | N2 | 9 | 350 | 0.0 | 21.6 |
| Cool down | N2 | 9 | 25 | 3.6 | 25.2 |

This activated catalyst was then used in polymerisation experiments which were carried out in a fluidised bed gas phase polymerisation reactor consisting of a plenum, a distribution grid, a vertical cylinder of diameter 0.75 m and height 5.2 m and a velocity reduction chamber. The hot reaction gases exiting the fluidised bed reactor pass through the expanded velocity reduction zone and are recycled to the reactor via a line equipped with a compressor and with a heat transfer means. The cooled recycle gas enters the reactor plenum in the lower part of the reactor vessel and into the fluidised bed consisting of a high density polyethylene powder via the distribution grid. Fresh make-up ethylene, hexene, pentane, hydrogen and nitrogen, which represent the main constituents of the gas reaction mixture are introduced into the recycle line.

The gas reaction mixture, which contains ethylene, hexene, pentane, hydrogen and nitrogen and other minor components passes through the fluidised bed at a pressure of 2.1 MPa, and with an upward fluidisation velocity of 0.46 m/s.

The polyethylene powder produced is continuously withdrawn to maintain a constant fluidised bed height. The powder is subjected to a conventional degassing procedure and then analysed with a Mastersizer S Malvern instrument by using the spray dispersion protocol. It exhibits a fragmentation coefficient of 0.315 (table 2).

According to the production rate, catalyst injection rate was set in order to maintain a constant residual chromium level on powder.

The operating conditions are shown below:
Polymerisation temperature 97 degrees C.
Partial pressure of ethylene 5.6 bar
Partial pressure of pentane 3.6 bar
Partial pressure of hydrogen 3 bar
Partial pressure of hexene 0.03 bar
Bed Level 5.2 meters
Fluidisation Velocity 46 cm/sec
Production rate 220 kg/h Comparative Example 1

A catalyst PQC24340 (® by P Q Corporation Catalysts) which is an aluminium modified silica supported chromium catalyst has been subjected to the activation procedure detailed herein below. Said catalyst has the following characteristics:
Chromium content (wt %) 1.0
Aluminium content (wt %) 2.1
Surface Area 390 m2/g
Pore Volume 2.20 ml/g
Typical D50 Malvern: ~105 μm.

30 Kg of the PQC24340 catalyst was charged in an activator having an internal diameter of 0.4 m. The fluidization starts at ambient temperature under nitrogen with a fluidization flow of 6.5 cm/s which will be maintained during the overall activation. Then the temperature was increased with a rate of 1.5° C./min up to 150° C. The catalyst is maintained at this temperature during 90 min under nitrogen. The temperature was increased again with a rate of 1.5° C./min up to 300° C. The catalyst is maintained at this temperature during 60 min under nitrogen. Then the fluidization gas is switched from nitrogen to air and the catalyst is maintained for another 60 min at 300° C. under air. The temperature was increased again with a rate of 1.5° C./min up to 500° C. The catalyst is maintained at this temperature during 480 min under air. Then the activator was cooled down with a rate of 1.5° C./min under air up to 350° C. and then up to ambient temperature under nitrogen.

This activated catalyst was then used in polymerisation experiments which were carried out in a fluidised bed gas phase polymerisation reactor consisting of a plenum, a distribution grid, a vertical cylinder of diameter 0.75 m and height 4.5 m and a velocity reduction chamber. The hot reaction gases exiting the fluidised bed reactor pass through the expanded velocity reduction zone and are recycled to the reactor via a line equipped with a compressor and with a heat transfer means. The cooled recycle gas enters the reactor plenum in the lower part of the reactor vessel and into the fluidised bed consisting of a high density polyethylene powder via the distribution grid. Fresh make-up ethylene, hexene, pentane, hydrogen and nitrogen, which represent the main constituents of the gas reaction mixture are introduced into the recycle line.

The gas reaction mixture, which contains ethylene, hexene, pentane, hydrogen and nitrogen and other minor components passes through the fluidised bed at a pressure of 2.1 MPa, and with an upward fluidisation velocity of 0.43 m/s.

The polyethylene powder produced is continuously withdrawn to maintain a constant fluidised bed height. The powder is subjected to a conventional degassing procedure and then analysed with a Mastersizer S Malvern instrument by using the spray dispersion protocol. It exhibits a fragmentation coefficient of 0.266 (table 2).

According to the production rate, catalyst injection rate was set in order to maintain a constant residual chromium level on powder.

The operating conditions are shown below:
Polymerisation temperature 107 degrees C.
Partial pressure of ethylene 8 bar
Partial pressure of pentane 4.4 bar
Partial pressure of hydrogen 3 bar
Partial pressure of hexene 0.0024 bar
Bed Level 4.5 meters
Fluidisation Velocity 43 cm/sec
Production rate 280 kg/h Comparative Example 2

A catalyst EP350X (® by Ineos Silica) which is a titanium modified silica supported chromium catalyst has been subjected to the activation procedure detailed herein below. Said catalyst has the following characteristics:
Chromium content (wt %) 1.0
Titanium content (wt %) 2.6
Surface Area 490 m2/g
Pore Volume 2.05 ml/g
Typical D50 Malvern: ~105 μm.

30 Kg of the EP350X catalyst was charged in an activator having an internal diameter of 0.4 m. The fluidization starts at ambient temperature under nitrogen with a fluidization flow of 6.5 cm/s which will be maintained during the overall activation. Then the temperature was increased with a rate of 1.5° C./min up to 150° C. The catalyst is maintained at this temperature during 90 min under nitrogen. The temperature was increased again with a rate of 1.5° C./min up to 300° C. The catalyst is maintained at this temperature during 60 min under nitrogen. Then the fluidization gas is switch from nitrogen to air and the catalyst is maintained for another 60 min at 300° C. under air. The temperature was increased again with a rate of 1.5° C./min up to 815° C. The catalyst is maintained at this temperature during 480 min under air. Then the activator was cooled down with a rate of 1.5° C./min under air up to 350° C. and then up to ambient temperature under nitrogen.

This activated catalyst was then used in polymerisation experiments which were carried out in a fluidised bed gas phase polymerisation reactor consisting of a plenum, a distribution grid, a vertical cylinder of diameter 0.75 m and height 5.4 m and a velocity reduction chamber. The hot reaction gases exiting the fluidised bed reactor pass through the expanded velocity reduction zone and are recycled to the reactor via a line equipped with a compressor and with a heat transfer means. The cooled recycle gas enters the reactor plenum in the lower part of the reactor vessel and into the fluidised bed consisting of a high density polyethylene powder via the distribution grid. Fresh make-up ethylene, hexene, pentane, hydrogen and nitrogen, which represent the main constituents of the gas reaction mixture are introduced into the recycle line.

The gas reaction mixture, which contains ethylene, hexene, pentane, hydrogen and nitrogen and other minor components passes through the fluidised bed at a pressure of 2.1 MPa, and with an upward fluidisation velocity of 0.55 m/s.

The polyethylene powder produced is continuously withdrawn to maintain a constant fluidised bed height. The powder is subjected to a conventional degassing procedure and then analysed with a Mastersizer S Malvern instrument by using the spray dispersion protocol. It exhibits a fragmentation coefficient of 0.247 (table 2). According to the production rate, catalyst injection rate was set in order to maintain a constant residual chromium level on powder.

The operating conditions are shown below:
Polymerisation temperature 93 degrees C.
Partial pressure of ethylene 9.7 bar
Partial pressure of pentane 3.7 bar
Partial pressure of hydrogen 3 bar
Partial pressure of hexene 0.03 bar
Bed Level 5.4 meters
Fluidisation Velocity 55 cm/sec
Production rate 230 kg/h

TABLE 2

| | Fragmentation coefficient | | |
| --- | --- | --- | --- |
| | Example 1 | Comparative Example 1 | Comparative Example 2 |
| Fragmentation coefficient | 0.315 | 0.266 | 0.247 |

The invention claimed is:

1. Process for producing a chromium catalysed ethylene copolymer powder wherein the chromium catalysed ethylene copolymer powder is characterised by a particle fragmentation coefficient ("m") equal or superior to 0.29, wherein the particle fragmentation coefficient ("m") of the copolymer powder is defined by $m = \mathrm{Ln}(\mathrm{APS\ particle}/\mathrm{APS\ catalyst})/\mathrm{Ln}(\mathrm{Productivity})$ wherein
"Ln" is the "natural logarithm",
"APS particle" is the median particle size (D50) of the polymer powder,
"APS catalyst" is the median particle size (D50) of the catalyst, and
"Productivity" is the number of grams of polymer per gram of catalyst, comprising polymerising the corresponding monomers in the presence of an activated supported chromium oxide based catalyst, wherein the process for the activation of said supported chromium oxide based catalyst is performed in a fluidised bed activation reactor which comprises a catalyst bed being fluidised by a fluidisation gas, said activation including treatment at temperatures above 500° C., wherein the fluidisation velocity (Vf1) of the fluidisation gas is initially maintained below 6.5 centimeters per second (cm/sec) until the temperature inside the activation reactor reaches at least 200° C., and said fluidisation gas is then brought to a value (Vf2) which is at least 1 cm/sec higher than Vf1.

2. Process according to claim 1 wherein said ethylene copolymer powder has been obtained by the gas phase polymerisation of ethylene together with at least one other alpha olefin containing from 3 to 12 carbon atoms in the presence of a supported chromium oxide based catalyst.

3. Process according to claim 1 wherein the control of the fluidisation gas velocity during the initial stage of the activation process is maintained until the temperature inside the activation reactor reaches 250° C.

4. Process according to claim 3 wherein the control of the fluidisation gas velocity during the initial stage of the activation process is maintained until the temperature inside the activation reactor reaches 400° C.

5. Process according to claim 1 wherein the fluidisation gas velocity during the initial stage of the activation process is maintained above 1.5 cm/s.

6. Process according to claim 1 wherein the fluidisation gas used during the initial stage of the activation process is an inert gas.

7. Process according to claim 1 wherein the fluidisation gas velocity Vf2 of the fluidisation gas used during the consecutive stage of the activation process is at least 1.5 cm/sec higher than Vf1.

8. Process according to claim 1 wherein the fluidisation gas used during the consecutive stage of the activation process is chosen amongst inert gases, or oxidising gases, or sequentially an inert gas followed by an oxidising gas.

9. Process according to claim 1 wherein said consecutive fluidisation stage includes thermal treatments with holding temperatures higher than 600° C.

10. Process according to claim 1 wherein the fluidisation gas velocity Vf2 is at least 6 cm/s.

11. Process according to claim 1 wherein the fluidisation gas velocity Vf2 is maintained below 12 cm/s.

12. Process according to claim 1 wherein the duration of the initial fluidisation stage lasts at least 1 hour.

13. Process according to claim 1 wherein the duration of the consecutive fluidisation stage lasts at least 1 hour.

14. Process according to claim 1 wherein the consecutive fluidisation stage comprises at least two separate thermal treatment steps wherein
the first step consists in bringing the catalyst from the initial stage under an inert atmosphere to a temperature comprised between 600 and 900° C. and then keeping the catalyst during a holding time of less than or equal to 8 hours under an inert atmosphere at a temperature comprised between 600 and 900° C., and
the second step consists in the treatment of the catalyst coming from step 1 under an oxidizing atmosphere at a temperature comprised between 400 and 700° C. during a holding time comprised between 2 and 10 hours, and
wherein the maximum temperature of the second step is always lower than the maximum temperature of the first step and wherein the difference between the maximum temperature of the first step and the maximum temperature of the second step is comprised between 50 and 250° C.

15. Process according to claim 1 wherein the supported chromium oxide based catalyst used to produce the powder is a titanium modified supported chromium oxide based catalyst.

16. Process according to claim 1 wherein the catalyst support is a refractory oxide support selected amongst silica, alumina, aluminophosphate, metal oxides, or combinations thereof.

17. Process according to claim 1 wherein the catalyst support is a spherical or spheroidal refractory oxide support.

18. Process according to claim 1 wherein the chromium oxide based catalyst contains 0.3 to 2% by weight of chromium being expressed with respect to the weight of final supported catalyst.

19. Process according to claim 1 wherein the chromium oxide based catalyst contains between 0.5 and 5% by weight of titanium being expressed with respect to the weight of final supported catalyst.

20. Process according to claim 1 wherein the fluidization velocity Vf1 of the fluidization gas is initially maintained below 5.5 cm/sec.

21. Process according to claim 1 wherein the fluidization gas velocity Vf2 is at least 7 cm/sec.

22. Process according to claim 18 wherein the chromium oxide based catalyst contains 0.3 to 1% by weight of chromium being expressed with respect to the weight of final supported catalyst.

23. Process according to claim 19 wherein the chromium oxide based catalyst contains between 1.5 and 4% by weight of titanium being expressed with respect to the weight of final supported catalyst.

\* \* \* \* \*